INVENTOR.
HINSDALE SMITH, JR.
BY Kenwood Ross
ATTORNEY.

INVENTOR.
HINSDALE SMITH, JR.
BY Kenwood Ross
ATTORNEY.

Nov. 6, 1962
H. SMITH, JR
3,062,469
WINDING APPARATUS
Filed July 27, 1960
4 Sheets-Sheet 3
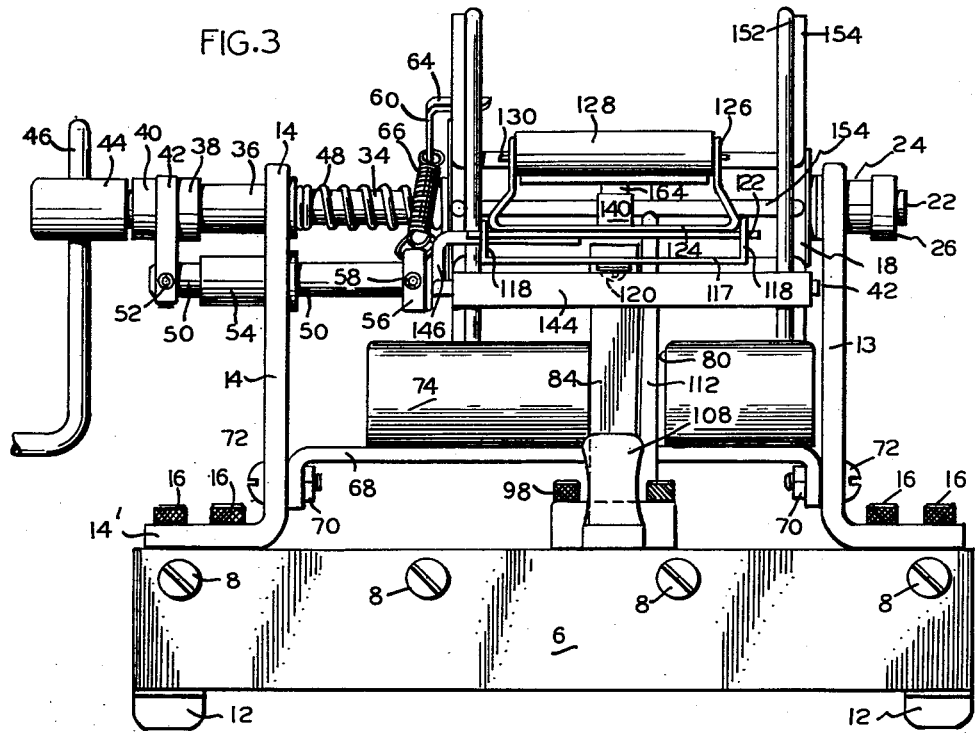
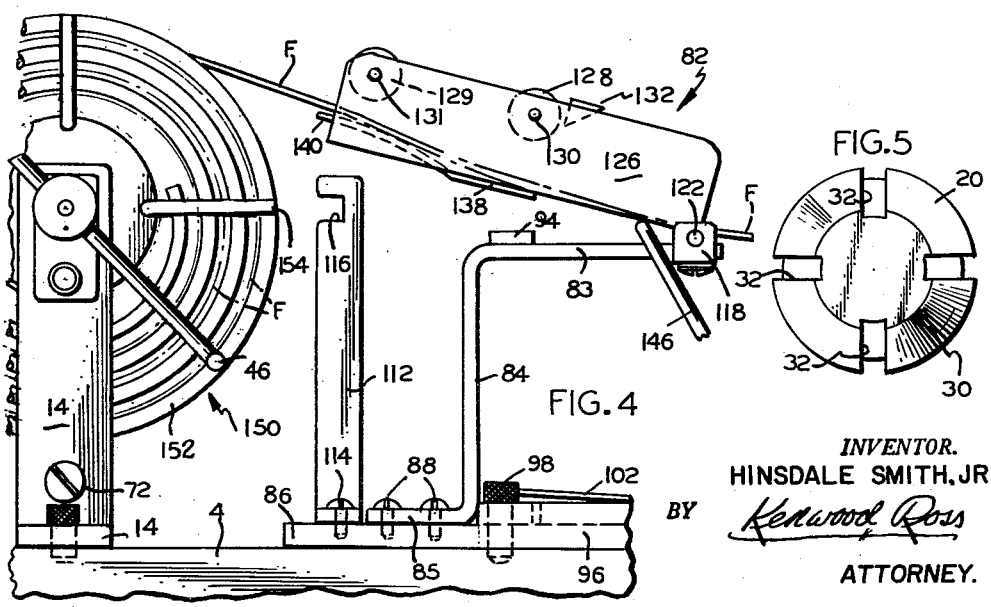
INVENTOR.
HINSDALE SMITH, JR.
BY Kenwood Ross
ATTORNEY.

Nov. 6, 1962   H. SMITH, JR   3,062,469
WINDING APPARATUS
Filed July 27, 1960   4 Sheets-Sheet 4
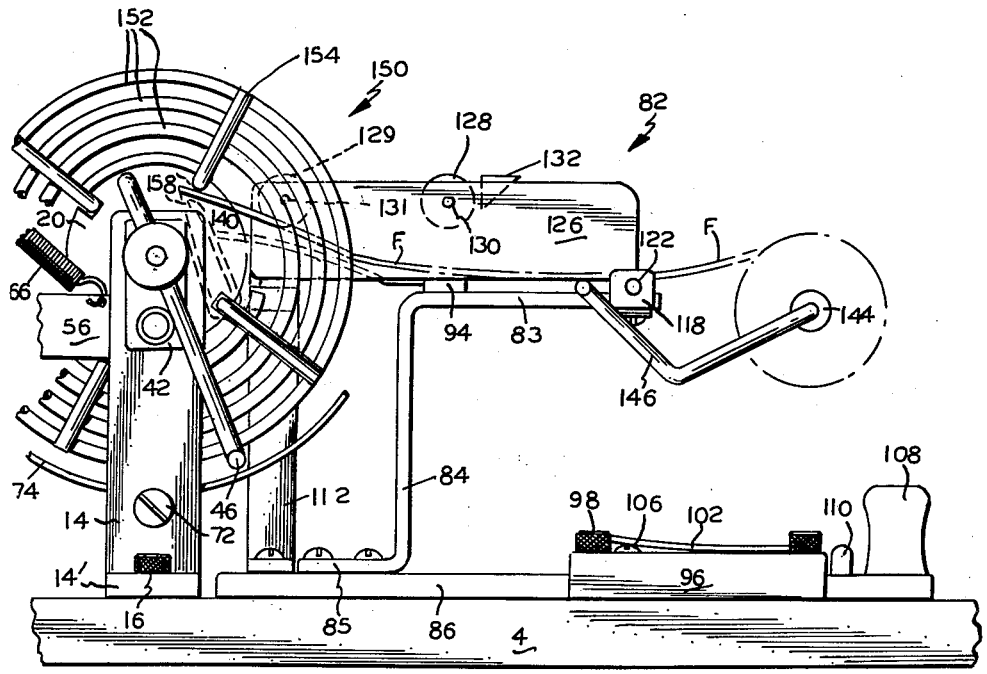
FIG.6
FIG.7
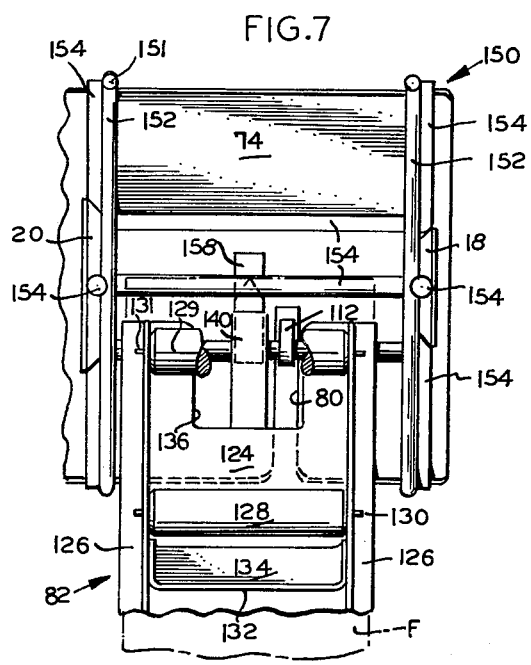
FIG.8
INVENTOR.
HINSDALE SMITH, JR.
BY Kenwood Ross
ATTORNEY.

3,062,469
WINDING APPARATUS
Hinsdale Smith, Jr., 179 Newbridge St.,
West Springfield, Mass.
Filed July 27, 1960, Ser. No. 45,697
1 Claim. (Cl. 242—77.1)

The present invention relates to new and useful improvements and structural refinements in winding apparatus and is directed more particularly to the provision of a novel film strip winder having general utility in the arts and to an improvement in the means for winding undeveloped photographic film onto a spool or reel in preparation for placement in a film developing tank or container preferentially of the type permitting the development of the film therewithin in the daylight and dispensing with the usual practice of carrying out such operation in a dark room.

The novel device may be adapted to accommodate motion picture film or the strip film, such as is used in conventional cameras, which is wound upon a spool prior to enclosure within a tank and emersion in a developing and/or fixing and/or washing solution.

It has been the practice in the trade, as exemplified by the known prior art, to wind the film upon the reel or spool by hand. In such operation, especially where it may involve the winding of hundreds of rolls of film daily, the fingers of the operator become tired and sore due to the manual dexterity required in the feeding of the film onto the reels. Not only is the work tiring, but also it is time consuming and thus expensive. Such problems have been accentuated by the fact that this process of film winding must normally take place in a darkened room, making it extremely difficult for the operator to correctly position the film for winding.

In contradistinction, I have devised a novel means whereby these difficulties and objections are overcome. I accomplish same by the provision of a device which obviates the necessity for the manual interengagement of film and reel and substitutes therefor what I prefer to define as an automatic system for effecting such interengagement by means of which the end of a roll or strip of film may be fed forwardly and automatically directed toward a point near the center of an already positioned spool for engagement therewith and then curved into a spiral disposition relative to and on the spool in manner so as to have a relatively small internal diameter at the center of the spiral and a relatively large outer diameter adjacent the outer periphery of the spool.

It is a principal object of the present invention to provide a device which not only correctly positions a take-up reel and the film for feeding thereupon, but also accomplishes the desired result with a minimum of manual operation in positioning the take-up reel and in preparing the film for the feeding step and with no manual engagement with the film following the said preparatory step, all so as to obviate the obvious objections to handling the film and particularly the photosensitive emulsion coating thereof any more than is necessary, if at all.

By way of further explanation, it should be made clear that films present particular difficulties in developing and fixing. Images are fixed on the light sensitive film, as is known, and the film then must be placed in a developing bath in a darkened room. Subsequently, in transferring to a fixing bath, the film must still not be exposed to light.

In recent years, tanks have been devised into which the films may be placed and the developing, fixing and washing carried on therein, all without the necessity for transfer therefrom.

Such tanks, of necessity, must be loaded in the dark so as to prevent obvious difficulties.

Aside from taking time, this requisite loading operation has presented the omnipresent threat of scratching the film.

The present invention envisions the easier loading of the reel or spool or film holder by the facilitation of the winding thereonto of the film, preparatory to the insertion thereof into the aforementioned tank. All of this work, that is the loading operation, of course, is carried on in the dark.

Further, as is known, the reel or film holder employed in such a tank is of such design and configuration that, preferentially, only the opposite side edges of the film, where there is no image, shall contact any parts thereof so as to obviate the possibility of film scratching and marking, and as is further known, the film is loaded thereonto so as to be held relative thereto in a spiral or ever-increasing-concentric-circle disposition, with the various so called layers of film being held in spaced relationship as to each other, all so that, once loaded and within the tank, the various liquors are free to be circulated about and through the reel and the various layers of film thereon so as to contact all portions of the film where and as needed.

It is a chief object of this invention to provide a film winding mechanism of the general character indicated which may be readily and successfully manipulated by the operator in darkness and whereby the roll of undeveloped film to be wound may be initially disposed upon a conveniently located supply spindle and the free end thereof may be inserted into a novel guiding means, whereupon the assemblage may be moved toward a pre-positioned, take-up reel or spool incorporating a novel spring clip mechanism which automatically engages with the film and aids in the initiation of the winding action.

The film take-up reel is automatically positioned and the guiding means correctly aligns the film relative to the take-up reel and the spring clip mechanism automatically engages the film, all without direct manual operation by the operator. Once engaged, the film may then be easily fed from the supply spindle through the guiding means and onto the take-up reel by the winding of the reel through means incorporated within the assemblage of this invention.

Other of the chief objects and purposes hereof are to provide advantageous structural and operational features in a device of the class to which reference has been made so as to provide an apparatus having the following inherent meritorious characteristics; first, a simplicity in construction and compactness of design and therefore an adaptability to economical manufacture; second, a uniqueness in engineering design of coacting parts wherefor the components are coordinated for facile assembly; third, a susceptibility to easy operation with respect to the purpose for which it is intended; fourth, a high degree of efficiency and dependability in its operational use; fifth, the provision of a construction which is well adapted to withstand the usage to which a film winding apparatus is ordinarily subjected; and sixth, the provision of such other improvements in and relating to a winding device of the type above referred to as are hereinafter described and claimed.

The novel features which I consider to be characteristic of my invention, as to its construction and organization and as to its methods of operation, will be best understood from a consideration of the following detailed description forming a part of this specification, and the illustration in the accompanying drawings, wherein like characters of reference are employed to designate like or corresponding parts throughout the several views and in which:

FIG. 3 is an end elevational view taken from the right as viewed in FIG. 1;

FIG. 4 is a fragmentary side elevational view of the guide means of the invention in the raised position;

FIG. 5 is an elevational view of one of the reel hub means of the invention.

FIG. 6 is a fragmentary, side elevational view showing the apparatus in reel loading position;

FIG. 7 is a fragmentary top plan view of the apparatus shown in FIG. 6; and

FIG. 8 is an enlarged diagrammatic view of the spring clip means of the invention.

Figure 1:
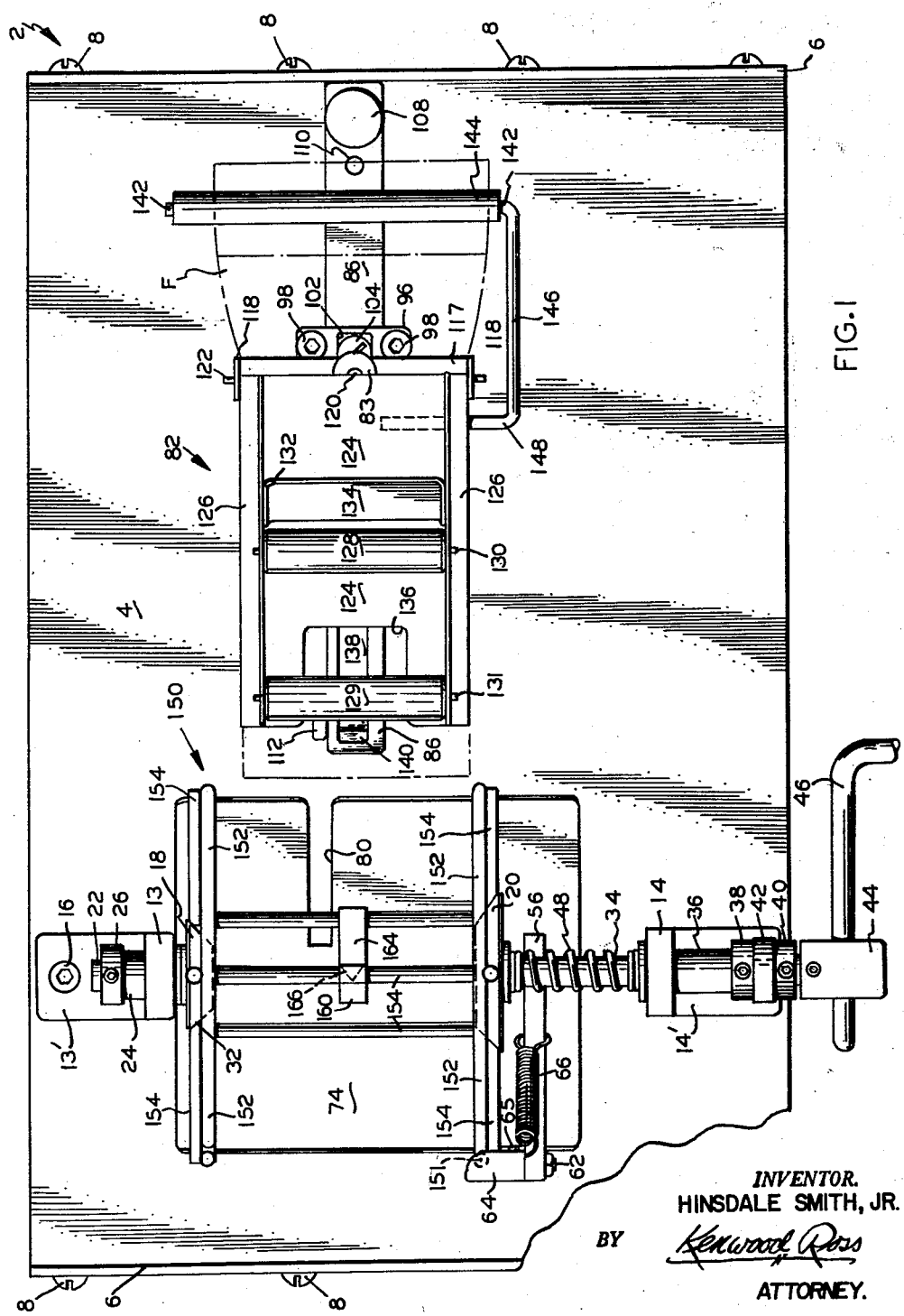
FIG. 1 is a top plan view of apparatus embodying the principles of the present invention.

With continued reference now to the drawings, which illustrate a typical and preferred embodiment of the invention for the purpose of disclosure and form a part of this specification, I have shown a film strip winding apparatus wherein the numeral 2 generally indicates the apparatus frame including a rectangular base 4 mounted upon spaced, parallel, vertically disposed, end frames 6 and secured thereto as by bolts or screws 8. The end frames 6 may be provided with inwardly extending feet 10 from which bumpers 12 may depend to prevent scarring or scraping.

Preferentially, the base 4 is inclined at a slight angle toward the operator as by the elongation of the feet 10 at the far side of the device away from the operator so as to aid in the operational use thereof, especially in those instances where the operator may be occupied with loading operations for hours at a time.

Spaced, generally vertically-disposed reel brackets 13 and 14 extend upwardly from the upper planar surface of the base 4 and are secured thereto as by bolts 16 extended through horizontally-disposed foot portions 13' and 14' of the respective brackets.

Suitable vertically-disposed inwardly-facing reel receiving and holding hubs 18 and 20 are disposed intermediate the spaced brackets 13 and 14, as will hereinafter appear. Said hubs are annular in their configuration and characterized by an outer, vertically-disposed outer face of a certain diameter, and an inner vertically-disposed inner face of a diameter less than the said certain diameter, so as to provide an annular side edge between said faces which inclines from the outer face inwardly toward the inner face in the manner of a bevelled edge 30 as best shown in FIG. 5.

Reel hub 18 is fixed to the inner extremity of a horizontally-disposed shaft 22, which shaft is rotatably mounted in bracket 13 upwardly of the base 4 as by a bearing 24. Said shaft 22 is constrained from lateral or in and out movement relative to bracket 13 by a collar 26 fixed to its outer extremity.

Reel hub 20 is slightly larger, diameterwise, than reel hub 18 and is provided, as shown in FIG. 5, with a plurality of radially-disposed recesses or grooves 32 in the annular side edge 30 thereof for the accommodation of take-up reel parts, as will hereinafter appear.

Reel hub 20 is fixed to the inner extremity of a horizontally-disposed shaft 34, which shaft is rotatably mounted in bracket 14 as by a bearing 36.

It will be observed that shafts 22 and 34 are horizontally and vertically aligned as to each other, wherefor, as will later appear, a take-up reel may be engaged by the aligned reel hubs 18 and 20 for the ready rotation of said take-up reel.

Spaced collars 38 and 40 are sleeved on said shaft 34 in manner to embrace therebetween a downwardly depending brace 42 disposed parallel to and outwardly of bracket 14.

A cap 44 is secured to the outer extremity of shaft 34, through which end cap and shaft, a handle 46, extending transversely to the axis of the shaft, extends.

A coil spring 48 is sleeved upon shaft 34 intermediate bracket 14 and reel hub 20.

When it is desired to mount a take-up reel (subsequently to be described) intermediate the hubs 18 and 20, an outwardly directed lateral force may be applied to handle 46 to cause shaft 34 and hub 20 to be moved laterally outwardly and coil spring 48 to be compressed. As the pressure on the handle 46 is released, the coil spring 48 insures the return of shaft 34 and hub 20 to the reel supporting position, shown in FIG. 1.

With reference to FIG. 3, a transversely-extending shaft 50 vertically spaced below and parallel to shaft 34 will be observed to be receivable in an opening in said brace member 42 and fixed relative thereto as by a set screw 52 or equivalent means.

Said shaft 50 is sleeved in a bearing 54 fixed in bracket 14 and is horizontally reciprocable with and upon the like reciprocation of shaft 34.

A latch bar 56 extends transversely relative to the axis of shaft 50 and is fixed thereto adjacent its inner extremity as by a set screw 58.

A stop 60 extends vertically upwardly from the opposite extremity of latch bar 56 and is pivotally mounted thereon as by a bolt 62 extendable through latch bar 56 and secured relative thereto as by a nut 63.

Stop 60 is provided at its upper extremity with an inwardly extending foot 64.

A pin 65 extends inwardly from latch bar 56 and functions as a stop to limit the inward pivotal swinging of stop 60 toward shaft 34.

A spring 66 is extendable between stop 60 and latch bar 56 whereby stop 60 may be retained in the position shown in FIG. 2 during operational use, as will be subsequently described. The stop 60 may be manually grasped and swung outwardly upon its pivot away from shaft 34 for purposes as will appear subsequently.

A lowermost brace 68 is disposed between brackets 13 and 14 and is fixed thereto as by nuts 70 and bolts 72, as shown in FIG. 3.

An arcuate reel-positioning means 74 is concaved to a suitable configuration so as to accommodate a take-up reel thereupon and is secured to brace 68 by any suitable means (not shown) so as to be disposed between brackets 13 and 14.

When my film winding device is utilized in a darkened room, this novel positioning means will make it possible to correctly position the take-up reel intermediate the reel hubs 18 and 20 with ease and facility.

After moving the reel-hub 20 laterally outwardly, the operator may place or rest the take-up reel upon the positioning device 74; upon release of the lateral outward pressure upon the handle 46, the hub 20 will move inwardly to engage and correctly position the take-up reel relative to the brackets 13 and 14, all without direct manipulation by the operator. Immediately upon rotation of the handle 46, the hubs 18 and 20 center upon the take-up reel and the reel is moved upwardly from and out of contact with the positioning means 74, thereby permitting free rotation of the take-up reel.

An elongated longitudinal slot 80 extends inwardly from the inner end of the reel-positioning means as shown by 74, and its function will shortly be observed.

Figure 2:
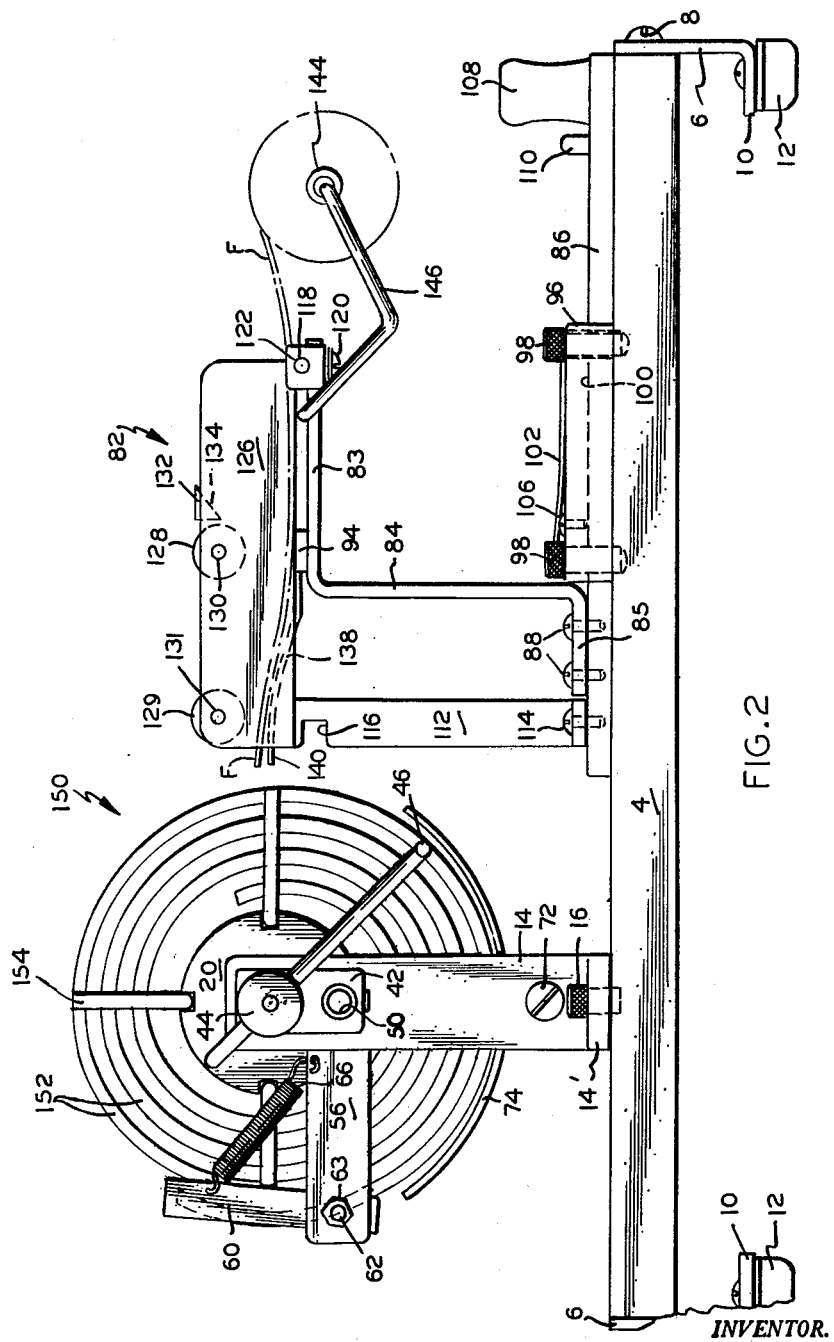
FIG. 2 is a side elevational view of the apparatus shown in FIG. 1.

As best illustrated in FIG. 2, a feed or guide means, generally indicated by 82, is disposed upwardly above the plane of base 4 and is pivotally mounted at the outer free end of the horizontally-extending upper tail portion 83 of a generally vertically-extending support 84, which support also has a horizontally-extending lower tail portion 85 secured to an elongated carrier 86 as by screws 88 or equivalent means.

A transversely-extending brace 94 is fixed to the said upper tail portion 83 by any suitable means and functions, together with said upper tail portion 83, as a support for maintaining guide means 82 in a substantially horizontally-disposed position above and parallel to base 4, as best shown in FIG. 2, which position is one of rest and is the normal position of said guide means 82.

As will shortly be observed, as the loading operation ensues, guide means 82 is raised or elevated upwardly away from the brace 94 upon its pivotal connection with the upper tail portion 83 by the film guided thereby as the loading thereof upon the take-up reel continues.

Carrier 86 rests upon the upper planar surface of base 4, is freely slidable relative thereto, and is reciprocable within a complemental slideway 100 centrally of and extending longitudinally through a housing 96 which is secured to the base as by bolts 98.

A flat spring 102 is fixed at one of its ends to the upper surface of housing 96 as by a screw 104 and at its opposite end embraces in a yielding manner the head of a screw 106 threadedly engaged with housing 96 and having an inner free end bearing upon the upper surface of carrier 86.

Spring 102, in combination with screw 106, aids in the maintenance of a desired tension on carrier 86 so as to allow for its ready manual reciprocation towards and away from brackets 13 and 14 and the instrumentalities therebetween, when and as operational use is indicated.

A manually-engageable knob 108, configured to accommodate the operator's fingers, is secured to and extends upwardly from carrier 86 for aiding in the reciprocation of the carrier towards and away from brackets 13 and 14 and relative to base 4.

An upstanding stop 110 is also provided on the upper surface of carrier 86 immediately forwardly of knob 108, which stop serves to limit the forward travel of carrier 86 upon abutment with the adjacent end wall of housing 96, as shown in FIG. 6.

A vertically-extending locking bar 112 is fixed, as by a screw or bolt 114, to the upper surface of carrier 86 forwardly of support 84 and is provided with a forwardly-facing notch or cut-out 116, which notch serves to lock on the take-up reel.

As aforesaid, upon abutment of the stop 110 with the housing 96, the carrier 86 is precluded from further forward motion, whereupon the notch 116 of the locking bar 112 is exactly positioned relative to the take-up reel.

A transversely-extending bracket 117, having upwardly and vertically-extending end walls 118, is fixed to the lower surface of the upper tail portion 83 as by a screw 120.

A transverse shaft 122 is suitably fixed to the lower surface of the film guide means 82 adjacent one end thereof and has opposite extremities journalled in suitably aligned openings in end walls 118 of bracket 117, whereby the film guide means may be pivoted relative to said bracket and to the upper tail portion 83.

The film guide means 82 is generally rectangular in configuration and includes a lower horizontally-disposed wall 124 which is disposed parallel to base 4 in the rest position and opposite generally upwardly-extending side walls 126.

Said side walls 126 will be observed in FIG. 3, to curve upwardly and inwardly toward each other from the plane of lower wall 124.

Rollers 128 and 129, carried by transverse shafts 130 and 131 respectively, are extendable between and are journalled in the opposite side walls 126 upwardly of the lower wall 124.

Roller 128 is positioned approximately centrally of film guide means 82 and roller 129 is positioned at the forward extremity of said film guide means.

A feeder trough 132 extends between side walls 126 immediately rearwardly of roller 128 and is fixed to said side walls as by soldering or the like.

Feeder trough 132 has a downwardly facing face 134 which inclines angularly downwardly to a point below the lowermost plane of roller 128.

Wall 124 of film guide means 82 is provided with a cut-out 136 adjacent its forward extremity through which cut-out the upper extremity of locking bar 112 extends.

An elongated forwardly-extending tongue 138 fixed centrally of the under surface of lower wall 124 has a free outer extremity 140 which curves upwardly through cut-out 136 and projects forwardly of film guide means 82.

A horizontally-disposed film supply spindle 142 is disposed rearwardly of the film guide means 82, and may include a felt or plastic sleeve or sheath 144 disposed thereon to prevent scratching or marring of the roll of film to be slipped thereon.

Spindle 142 is fixed to film guide means 82 by means of a rod 146 which has a foot portion 148 extending below and fixed to lower wall 124 of said film guide means adjacent the bracket 117 as by soldering or the like.

A film reel or holder is generally indicated by 150 and functions as a take-up spool and, in operational position, is disposed between the reel hubs 18 and 20.

Said reel is adapted to hold the film for the developing and/or fixing and/or washing operations when disposed within the light-sealed developing tank (not shown, same not forming part of this invention).

The reel may comprise end plates 152 which are connected by any desirable means such as a plurality of posts 154 of a length commensurate with the width of the film to be accommodated thereby.

End plates 152 are formed of identical, spirally-wound, wire to provide on their inner faces oppositely-spaced, parallel-disposed spiral channel guides formed by the adjacent convolutions of the respective wires. That is, the spiral wire in the case of each end plate is projected from or emanates from the periphery of a circle which defines a central hub-receiving opening through the end plate and is carried out to the outer periphery of the end plate.

Said central opening and the channel guides provide in effect openings through the end plates communicating with the reel interior so as to facilitate circulation of the developing, fixing and washing liquors.

When reel 150 is mounted upon reel hubs 18 and 20, posts 154 are receivable in recesses or grooves 32 provided in the inclined edge wall 32 of hub 20 and embrace hub 18, thereby fixing the reel relative to the rotative means in film loading and winding positions.

An outer extremity 151 of the wire used to form one of the end plates 152 of the reel will lie immediately below foot 64 which extends inwardly from bar 60. Upon clockwise rotation of the reel, said extremity 151 will be caused to abut the under surface of foot 64 preventing further rotation of the reel and positioning the reel.

A spring clip 158, formed from a resilient metal is fixed to a pair of the posts 154 and, as viewed in FIG. 8, has an upper extremity 160 which enwraps one of these posts and extends rearwardly and downwardly to form a base wall 162, which base wall extends angularly downwardly to another of the posts 154 at which point it curves upwardly to form the forward catch 164 which rises upwardly to terminate at a point immediately below the upper post 154.

The upper extremity 160 of the forward catch 164 converges to a point 166, which point contacts the under surface of the upper extremity 160 and operates in a wedging action with said extremity 160.

In operational use, a roll of undeveloped film F, shown in phantom in the drawings, is disposed upon film supply spindle 142.

A forward end of the film is gently inserted into the feed or guide means 82 under feeder trough 132 and under rollers 128 and 129 and is then passed over the extremity 140 of tongue 138 to extend slightly outwardly therebeyond.

The reel 150 and spring clip 158 have previously been positioned and the reel locked therein for receipt of the film.

The operator grasps knob 108 and slides carrier 86 forwardly toward reel 150, thereby imparting a similar motion to guide means 82 and locking bar 112. When stop 110 abuts housing 96, further forward movement of the carrier is precluded and the components of the apparatus have assumed the positions shown in FIG. 6. One of the posts 154 of reel 150 now rests within the notch or groove 116 of locking bar 112 thereby insuring against accidental rotation of the reel. It will be noted that locking bar 112 is aligned with the elongated slot 80 in the reel-positioning means 74, whereby said locking bar may be moved forwardly to its abutting position relative to post 154.

The forward extremity 140 of tongue 138 now embraces forward catch 164 of spring catch 158 and has slightly depressed said member 164 whereby point 166 thereof is cleared from its contact with upper end 160 of the spring catch.

The operator may now position the leading edge of the film between point 166 and the upper end 160 of the spring catch.

The carrier 86 is now moved rearwardly until the edge of the vertical brace bar 84 contacts housing 96 at which time further rearward movement of the carrier is precluded.

The vertical locking bar 112 has been cleared from its engagement with the post 154 and the forward edge 140 of the tongue 138 no longer depresses the forward catch 164 of the spring catch 158. Thus, the leading edge of the film is securely held between the point 166 and the edge 160 of said spring catch. The film is now properly positioned and secured on the reel 150 and may be wound thereon by counterclockwise rotation of the handle 46. As the film is wound upon the reel of the film guide means 82 gradually pivots upwardly on the shaft 122 to accommodate for the increased circumference of the film disposed upon the reel.

When the film has been completely wound upon the reel, the reel may be removed from its position intermediate the hubs 18 and 20 by the exertion of a laterally outward force upon the handle 46 thereby releasing the reel from its engagement within the grooves 32 of the hub 20, at which time the reel may be grasped and moved upwardly from the apparatus.

The film will be disposed in spaced apart, generally concentric circles upon the reel, thereby presenting a continuous, open surface to the developer when the reel is placed in a developer tank.

Without further analysis, the foregoing is intended to so fully reveal the gist of my invention and its construction and operation that others can, by applying current knowledge, readily adapt it for various applications without omitting features which, from the standpoint of prior art, fairly constitute essential characteristics of its generic and/or specific aspects. The substitution of equivalents and other changes, modifications and alterations as circumstances may suggest or render expedient, are contemplated since the invention is susceptible of such without departing from its real spirit or underlying principles. Stated otherwise, it is not desired to limit this invention to the exact construction shown and described as the objects hereof may be attained by the use of constructions different in certain respects from that disclosed; for instance, the apparatus hereof may be modified to accommodate reels other than the wire type, while the base of the apparatus frame may be inclined to facilitate ease of operation.

Additionally the end frames may be provided with suitable cut-outs or handles whereby the apparatus may be readily transported from place to place.

Alternatively, it will be further understood that the novel apparatus may be permanently secured to any suitable work surface if desired.

It should be noted that the device hereof may be conveniently utilized in the winding of any elongated strip material onto a receiving spool, and its use is not confined to the winding of photographic film. For example, my novel apparatus may be utilized for the winding of cash register tapes or the like.

The invention is claimed, broadly as well as specifically, as indicated in the appended claim, and same are desired to include within the scope thereof all of said suitable variations, modifications and equivalents by which substantially the results of the invention may be obtained through the use of substantially the same or equivalent devices or means. Accordingly, limitation hereof should only be made as determined by a proper interpretation of the subjoined claim.

What is claimed as new and useful is:

Apparatus for processing a roll of strip film comprising: a take-up reel for said film strip including, end plates formed of identical spirally-wound wire to provide on their inner faces oppositely-spaced parallel disposed channels, a plurality of posts connecting said end plates; a support; a pair of spaced upstanding reel brackets extending upwardly from said support; positioning means between said reel brackets upon which the take-up reel may be disposed; a pair of inwardly facing horizontally-aligned holding hubs for engaging the posts of said take-up reel and effecting the rotation of said reel, each of the hubs of said pair being rotatively held relative to one of the brackets of said pair, one of the hubs of said pair being yieldingly movable laterally towards and away from the other of the hubs of said pair; drive means for imparting a rotative movement to said one hub; resilient clip means having a film impinging end integral therewith fixed to said posts of said reel; a film guide means manually slidable along said support in a direction transverse to the axis of rotation of said reel towards and away from said reel; stop means operatively connected to one of said brackets to limit the rotation of said reel in a certain direction to properly position said resilient clip means relative to said film guide means; said film guide means having a locking bar integral therewith to engage one of the posts of said reel to effectively lock said reel against rotation in a direction opposite to said certain direction; and said film guide having a tongue fixed thereto and extending forwardly thereof for depressing said film impinging end of said resilient clip means to effectively open said resilient clip means whereby an end of the film carried by said guide means may be positioned therein.

References Cited in the file of this patent

UNITED STATES PATENTS

| | | |
|---|---|---|
| 229,707 | Jenne | July 6, 1880 |
| 1,188,217 | Stehle | June 20, 1916 |
| 1,464,463 | Wood | Aug. 7, 1923 |
| 1,506,891 | Duncan | Sept. 2, 1924 |
| 1,629,459 | Jenkins | May 17, 1927 |
| 2,022,807 | Hagerty | Dec. 3, 1935 |
| 2,073,978 | Smith | Mar. 16, 1937 |
| 2,129,573 | Gabbott et al. | Sept. 6, 1938 |
| 2,371,073 | Smith | Mar. 6, 1945 |
| 2,692,736 | Hanley | Oct. 26, 1954 |
| 2,766,950 | Speed et al. | Oct. 16, 1956 |
| 2,990,128 | Hansen et al. | June 27, 1961 |

FOREIGN PATENTS

| | | |
|---|---|---|
| 588,188 | Great Britain | May 16, 1947 |
| 645,568 | Great Britain | Nov. 1, 1950 |